March 16, 1965  C. B. STRANDGREN  3,173,304
NUT AND SCREW DEVICES

Filed Dec. 19, 1962  2 Sheets-Sheet 1

Inventor:
Carl Bruno Strandgren
By Ernest Montague
Attorney

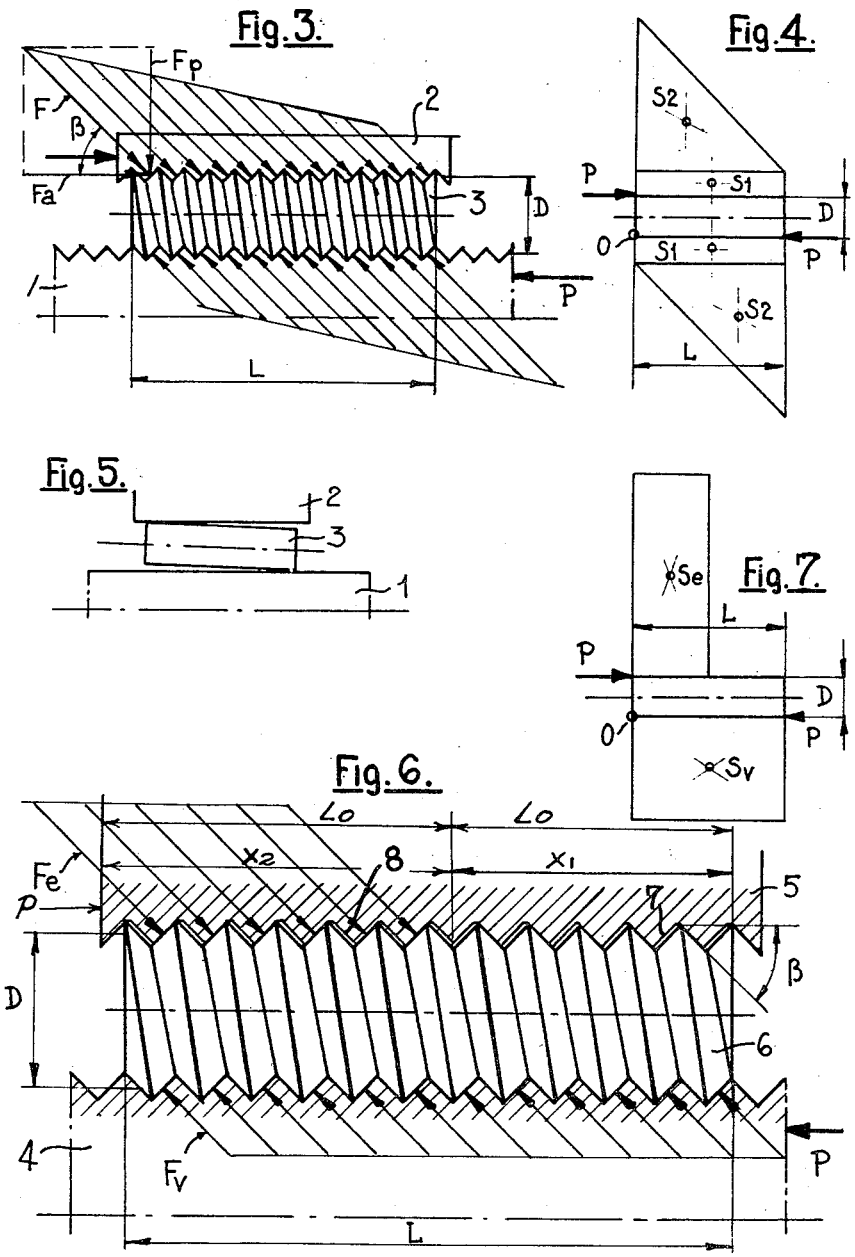

United States Patent Office 3,173,304
Patented Mar. 16, 1965

3,173,304
NUT AND SCREW DEVICES
Carl Bruno Strandgren, 12 Chemin de la Plaisante,
Lausanne, Switzerland
Filed Dec. 19, 1962, Ser. No. 245,741
1 Claim. (Cl. 74—459)

The present invention relates to nut and screw devices having screwthreaded satellite rollers, comprising a screw, a nut coaxial of the screw and screwthreaded satellite rollers disposed therebetween and meshing therewith by way of their screwthreads. The known devices of this kind make it possible to provide nut and screw devices having a very low friction.

The reduced friction improves the efficiency of the device, and the increase in efficiency enables the force required to operate them to be reduced, with a consequent reduction in the forces concerned, and so devices of this kind are very suitable for accurate control of movements of the tables or other parts of a machine tool, for since the forces operative on the screw are smaller than previously, distortion of the screw and of the other parts of the mechanisms is also reduced, so that one of the main causes of inaccuracy in mechanisms of this kind is obviated.

In devices required to operate at high loads, such as rams or presses or the like, the screw has to withstand heavy stressing in the interest of reducing the space taken up by the device; consequently, the screw experiences considerable resilient deformations which become considerable over the length of the rollers, such length being relatively large also. The axial load may therefore vary considerably as between the various turns of the screwthread and so, to obviate this disadvantage, it has been proposed, as described in Swiss patent specification No. 335,263, so to devise the rollers as to permit a relative variation in length between the nut and the screw when axial loads are applied, so as to even out the force operative on each turn of the roller screwthreads, notwithstanding the longitudinal distortion of the nut and screw.

However, the correction proposed by Swiss Patent No. 335,263 leads to favorable results only if the rolling device operates at a substantially constant axial load and, more particularly, an axial load which is directed constantly in the same direction, whereas in the precision control equipment used in machine tools and scientific instruments (lead screws), the screw is required to have very great axial rigidity, so that the trend is towards using rolling devices whose screw is of relatively large cross-section and is lightly loaded, the rollers being fairly short. The axial load applied to the device is therefore usually variable in magnitude and in direction, and so the proposed correction, which is not directly necessary since the screw is very rigid, would provide substantially no improvement in the operation of the device.

However, contact pressures can be distributed more evenly, and the stability of the rollers can be improved, by other means which have not previously been used in the known devices, and this invention has as its subject matter a nut and screw device of the kind specified in which the screwthreaded rollers have increased stability independently of any variations which may occur in the amount and direction of the axial load.

The invention provides a device of the kind specified wherein the nut screwthread is relieved on the right-hand flank of its screwthread over a zone extending from the right-hand end of the nut, and on the left-hand flank of its screwthread over a zone extending from the left-hand end of the nut, so that the rollers mesh with the nut screwthread only by way of the right-hand flank of their screwthread at a left-hand end part of the nut and only by the left-hand part of their screwthread at a right-hand end part of the nut.

In the known devices, such as the one disclosed by Swiss patent specification No. 335,263, the tilting moment experienced by the satellite rollers is taken by pivots disposed at the two ends of the rollers and received in bearings in two bracing rings. It is another object of the present invention to provide nut and screw devices which obviate this tilting moment, so that the load on the roller pivots is reduced substantially to zero, with a corresponding considerable improvement in the efficiency of the device.

With these and other objects in view which will become apparent in the following detailed description, the present invention will be clearly understood in connection with the accompanying drawings, wherein:

FIGS. 3, 4 and 5 are diagrammatic views showing how the forces are distributed over a satellite roller in one known bearing device, FIG. 3 being a view in partial longitudinal section and in simplified form of the device, FIG. 4 being a load diagram, and FIG. 5 being an explanatory diagram;

FIG. 6 is a diagram, to a larger scale than FIG. 1, showing the clearances effected according to the invention on the surfaces of the nut threads in the case of a nut which, to simplify matters, has been assumed to have a reduced number of turns, and FIG. 7 is a load diagram similar to FIG. 4 but for the device illustrated in FIG. 6.

Figure 1:
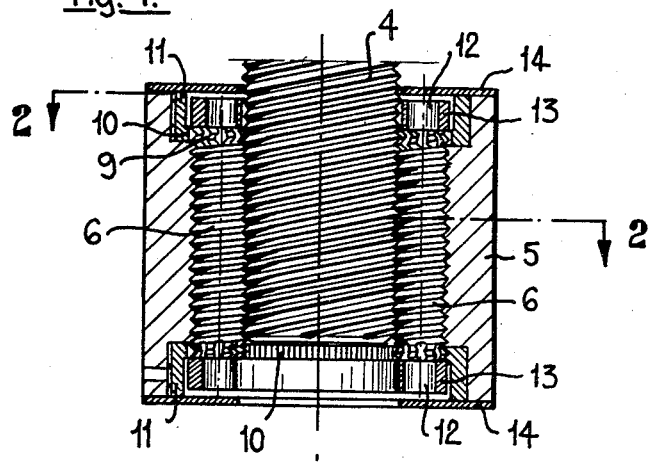
FIGURE 1 is a view of the device in longitudinal section.
Figure 2:
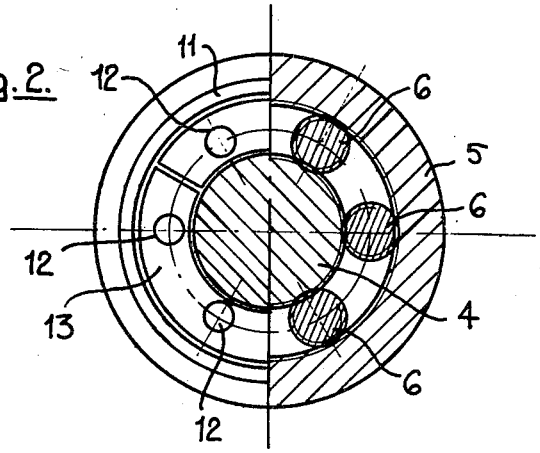
FIG. 2 is a horizontal section taken along the lines 2—2 of FIG. 1.

The embodiment illustrated in FIGS. 1 and 2 is a device of known kind comprising a screw, a nut and screwthreaded rollers, the latter not moving axially in relation to the nut.

The device according to the invention comprises a screw 4, a nut 5 coaxial thereof, and six screwthreaded satellite rollers 6 disposed between the screw 4 and the nut 5 and engaging with the screwthreaded parts thereof. The rollers 6 are so disposed that a radial plane passing through the axis of the device and through the axis of any roller cuts the nut, the particular roller concerned and the screw along profiles which coincide, while the slopes of the screwthreads of the nut and screw are so devised that the rollers 6 when rolling without sliding in the nut 5 are not by this rolling made to move longitudinally relatively to the nut. To obviate any sliding of the rollers 6 relatively to the nut 5, each roller 6 has at each of its ends, at a place 9 visible in FIG. 1, outer straight teeth cut through the screwthreads of the roller. Such teeth mesh with the inner teeth 10 cut in rings 11 rigidly secured to the nut 5. The rollers 6 are extended by plain pivots 12 (FIG. 1) engaged in two bracing rings 13 retained, with slight axial clearance, by retaining plates 14 rigidly secured to the nut 5. The axial force applied, for example, to the screw is transmitted thereby to the rollers and thence to the nut, so that forces are operative on one side of one roller at the places where the screwthreads thereof engage with the screwthreads of the screw, and on the other side of the roller, at the places where the roller screwthreads engage with the nut screwthreads.

As stated in the preamble, the device just described may have a disadvantage which can be considerable if the nut screwthread is engaged by its two surfaces and over the whole length of the rollers with the screwthread thereof, for in a device of the kind diagrammatically illustrated in FIG. 3, where a roller 3 co-operates with a nut 2 over its whole length, a force F perpendicular to the inclined flank of the screwthread is originated at each contact place. The force F is not constant along the roller. To meet equilibrium conditions, such force should grow in accordance with the linear diagram given in FIG. 3, as will be described hereinafter. Each of the forces F can be broken down into one component $Fa$ parallel with the screw axis and into a component $Fp$ perpendicular to such axis, and $Fp=Fa.\text{tg } \beta$ where $\beta$ is the angle of inclination of the screwthread flank (FIG. 3). Also, for an axial force P applied to the screw:

$$\Sigma Fa=P, \text{ and } \Sigma Fp=P.\text{tg } \beta=N \quad (1)$$

The force N is a load which is irregularly distributed along the roller and which can be represented, as shown in FIG. 4, by a trapezoidal surface S formed by a rectangular surface part S1 and by a triangular surface part S2, with:

$$N=S=S1+S2 \quad (2)$$

When the roller is in equilibrium, L denoting roller length and D denoting roller diameter, the sum of the moments—which is therefore zero—can be represented as follows in relation to the point 0 (FIG. 4):

$$\Sigma M=0=PD+S1.L/2+S2.L/3-S1.L/2-S2.2L/3$$

$$\therefore PD-S2.L/3=PL(D/L-S2/3P)=0 \quad (3)$$

From (1) to (2), $P=N/tg\ \beta=(S1+S2)/tg\ \beta$, and by substitution in the second term of (3):

$$PL[D/L-S2.\text{tg } \beta/(S1+S2).3]=0$$

Consequently, since the product PL is not zero, it is impossible to avoid:

$$D/L=[S2/(S1+S2)].\text{tg } \beta/3 \quad (4)$$

For a given screwthread flank angle $\beta$, $\text{tg } \beta/3$ is a constant, and it will be apparent that S2 is greater in relation to N in proportion as the ratio DL is greater. S2 will disappear only for a roller of infinite length. For instance, in the case of the device illustrated in FIG. 3 in which the ratio $D/L=1/4$ and the angle $\beta=45°$, $$(\text{tg } \beta=1)$$

$$S2/(S1+S2)=D/L.(3/\text{tg } \beta)=3/4; \therefore S2=3S1 \quad (5)$$

Therefore, the load diagram takes up the proportions illustrated in FIG. 4, and the pressure on the screwthread at the more heavily loaded end of the roller is seven times greater than at the other end of the roller. In practice, the ratio $D/L$ is always excessive, and immediately there is any clearance the rollers tend to become inclined, as diagrammatically illustrated in FIG. 4, with the result that the rolling resistance increases.

It is an object of the invention to obviate this disadvantage.

In the embodiment of the device according to the invention illustrated in FIG. 6, there can be seen a central screw 4, a nut 5 and one screwthreaded satellite roller 6 of a number of such rollers. The screwthreading of the nut 5 is relieved on the right-hand flank, as denoted by the reference 7, on a part of the screwthread extending from the right-hand end of the nut (FIG. 6), and is relieved on the left-hand flank of its screwthread, having a length $X_1$ as indicated by the reference 8, on a left-hand part of the screwthread having a length $X_2$ extending from the left-hand end of the nut. In the device illustrated, the two lengths $X_1$ and $X_2$ are the same, the nut screwthreading each corresponding to half the useful length L of the roller screwthread. Consequently, the roller engages with the nut, by the corresponding flank of its screwthread, over only a length Lo corresponding to one-half of its useful length L. $(L-X_1)/L=(L-X_2)/L$.

The ratio $Lo/L$ will be referred to as C hereinafter, and it will be shown that a relationship can be set up between the ratio C and the ratio $D/L$ of the roller (in which D is the diameter and L is the length of the rollers) such that the roller is in equilibrium while the forces $Fv$ and $Fe$ which are perpendicular to the screwthread flank and which originate at the places of engagement of the screwthreads on the screw side and nut side respectively are constant along the roller (FIG. 6).

In this hypothesis, represented by the load diagram illustrated in FIG. 7, the equation of moments relatively to the point 0 is set up as follows:

$$\Sigma M=0=PD+Se.CL/2-Sv.L/2=0 \quad (6)$$

Now $\Sigma Fv=\Sigma Fe$, so that $Se=Sv=S$.

From (2) and (1), $S=N$ and $N=P.\text{tg } \beta$, so that Equation 6 becomes:

$$\Sigma M=0=PD-P.\text{tg } \beta.L/2.(1-C), \text{ whence} \quad (7)$$
$$\Sigma M=0=PL[D/L-\text{tg } \beta/2.(1-C)] \quad (8)$$

Since PL is not zero, therefore:

$$D/L=\text{tg } \beta/2.(1-C), \text{ whence:} \quad (9)$$
$$C=1-(2D/L.\text{tg } \beta)$$

in which $$C=(L-X)/L \quad (10)$$

$\text{tg } \beta/2$ is a constant for a given angle $\beta$, and the value of C can be determined in dependence upon the ratio $D/L$. For instance, if $\beta=45°$, $\text{tg } \beta=1$ and $C=1-2D/L$, so that, for instance, if $D/L=1/4$, then $C=1/2$; If $D/L=1/5$, $C=3/5$; if $D/L=1/6$, then $C=2/3$, and if $D/L=1/8$, then $C=3/4$. In the example given in FIGS. 6 and 7, $D/L=1/4$ and $C=Lo/L=1/2$.

Clearly, relieving the nut screwthread in the manner just described leads to uniform distribution of the contact pressures over the various screwthreads and to satisfactory stability of the rollers. This ensures better use of the material and helps to ensure excellent rolling of the device even if play enters the rollers. The relief proposed by the invention is very useful in cases where it is required to reduce the length L for a given diameter D. Dressing the nut screwthread is easy since there is no need for great accuracy.

The relief according to the invention of the nut screwthread obviates any tilting moment being applied to the rollers to either hand of rotation and whatever the magnitude of the thrust applied to the device. Consequently, the roller pivots 12 are relieved of load.

While I have disclosed several embodiments of the present invention, it is to be understood that these embodiments are given by example only and not in a limiting sense, the scope of the present invention being determined by the objects and the claim.

I claim:

A nut and screw device having screwthreaded satellite rollers, comprising a screw, a nut and screwthreaded satellite rollers disposed therebetween and meshing therewith by way of their screwthreads, wherein the nut screwthread is relieved on the right-hand flank of its screwthread over a zone extending from the right-hand end of the nut, and on the left-hand flank of its screwthread over a zone extending from the left-hand end of the nut, so that the rollers mesh with the nut screwthread only by way of the right-hand flank of their screwthread at a left-hand end part of the nut and only by the left-hand part of their screwthread at a right-hand end part of the nut, and the nut screwthreading being relieved on one of said flanks of the screwthread over a part L$o$ of the length of the nut determined by the formula:

$$Lo/L = 1 - \frac{2D}{L \operatorname{tg} \beta}$$

in which:
L is the useful length of the nut;
L$o$ is the relieved length of the nut screwthread;
D is the pitch diameter of the rollers, and
$\beta$ is the angle of inclination of the screwthread.

References Cited by the Examiner

FOREIGN PATENTS 1,199,429  6/59  France.

DON A. WAITE, *Primary Examiner.*